United States Patent [19]

Clinch

[11] Patent Number: 5,036,567
[45] Date of Patent: Aug. 6, 1991

[54] PUSH-IN FASTENER CLIP

[75] Inventor: James P. Clinch, Farmington Hills, Mich.

[73] Assignee: Eaton Corporation, Cleveland, Ohio

[21] Appl. No.: 630,929

[22] Filed: Dec. 20, 1990

[51] Int. Cl.⁵ .............................................. A44B 17/00
[52] U.S. Cl. ...................................... 24/453; 24/297; 411/508; 411/913
[58] Field of Search .................. 24/453, 458, 295, 297, 24/704.1; 411/508, 913

[56] References Cited

U.S. PATENT DOCUMENTS 2,451,591 10/1948 Tinnerman et al. ................. 411/508
4,438,552 3/1984 Omata ................................ 24/704.1
4,644,612 2/1987 Osterland ............................. 24/295
4,708,895 11/1987 Mizusawa ............................ 411/913
4,924,561 5/1990 Yoneyama ........................... 24/453

Primary Examiner—Victor N. Sakran
Attorney, Agent, or Firm—A. E. Chrow

[57] ABSTRACT

A press-in fastener clip (50) is provided that features a resilient locking arm (10) having a surface (18) adapted to releasably secure clip (50) to an aperture (16). Clip (50) has a V shaped insertion leg (8) that is operative to assist in securing clip (50) to aperture (16) as well as to automatically urge clip (50) outwardly therefrom upon manual release of locking arm (10).

8 Claims, 1 Drawing Sheet

PUSH-IN FASTENER CLIP

INTRODUCTION

This invention relates generally to a push-in type fastener clip and more particularly to such clip having a V shaped insertion leg adapted for receipt into a aperture and operative to both assist in locking the clip to the aperture as well as to resiliently urge the clip outwardly therefrom upon release of a resilient arm locking the clip to the aperture.

BACKGROUND OF THE INVENTION

Push-in type fastener clips have long been known in the art. Such clips are adapted to be pushed into an aperture or opening in an object such as a panel and become automatically secured thereto commonly upon expansion of a component thereof that was contracted during the process of pushing the clip into the aperture.

Examples of such push-in type fasteners are disclosed in U.S. Pat. Nos. 1,925,488; 3,303,542; 4,402,184; 4,438,552; 4,644,612; and 4,924,351, the disclosures all of which are included herein by reference.

None of the push-in type fasteners heretofore known in the art however have featured components operative to assist in securing the fastener to the aperture as well as to automatically urge the fastener outwardly from the aperture upon release of a locking component that is releasable from the same side of the aperture into which the fastener is received.

Even more particularly, the push-in fastener clip of the present invention enables rapid securement by the merely pressing it into an aperture as well as rapid removal from the aperture by automatically urging itself outwardly therefrom upon contraction of a locking arm accessible on the same side of the aperture in which the clip is received.

SUMMARY OF THE INVENTION

Accordingly, it is an object of this invention to provide a push-in type fastener clip that is adapted to automatically secure itself to an aperture into which it is inserted.

It is another object of this invention to provide a push-in type fastener clip having a component that is adapted to both assist in securing the clip to the aperture and to automatically urge the clip outwardly from the aperture upon contraction of a locking member accessible on the same side of the aperture in which the clip is received.

DESCRIPTION OF SOME PREFERRED EMBODIMENTS

Figure 1:
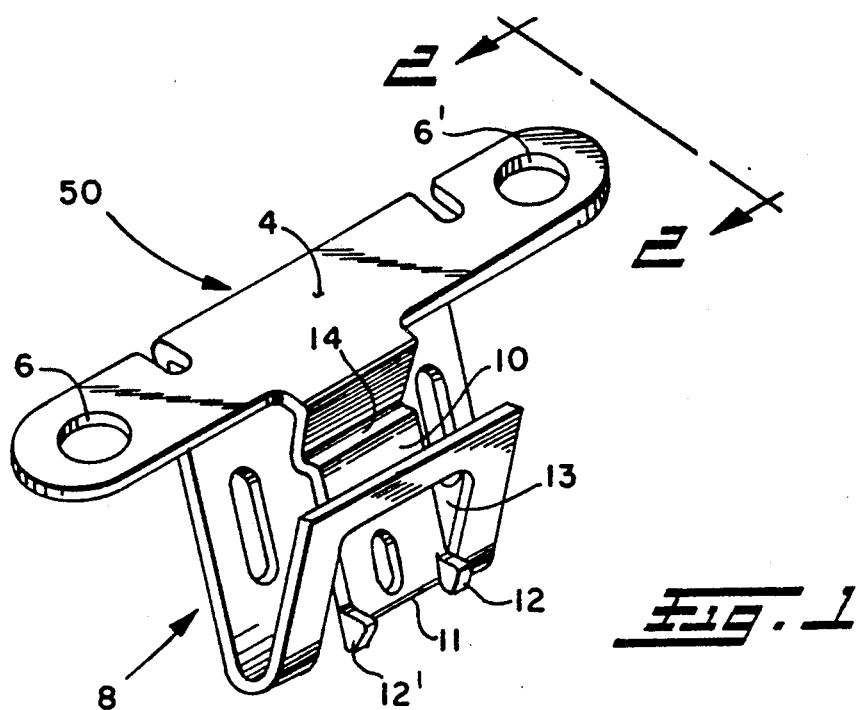
FIG. 1 is a perspective view of a push-in fastener clip 50 of the invention.

Fastener clip 50 of FIG. 1 is illustrative of a preferred embodiment of the push-in fastener clip of the invention. Clip 50 is preferably a one-piece construction folded from a suitable resilient plastic or sheet metal material.

Clip 50 has a base portion 4 that preferably has the elongate flat configuration shown in FIG. 1. Base portion 4 preferably has one opening 6 and more preferably spaced-apart openings 6 and 6' therethrough for securing some type of object to clip 50 which in turn releasably secures the object to a panel or the like as hereinafter described.

One application for which openings 6 and 6' may be utilized is where clip 50 is used to attach a glass plate to a panel where, for example, a suitable adhesive is inserted into openings 6 and 6' and the glass is then pressed thereagainst for securement to clip 50 which in turn is releasably secured to a panel or the like.

Clip 50 has a resilient insertion leg referenced by numeral 8 that extends from base portion 4 and is "V" shaped and adapted to be inserted into an aperture in a panel or the like. As herein used the word "panel" means any object having an aperture into which the fastener clip of the invention can be lockingly secured and as such is not therefore limited solely to a panel but includes plates and other objects.

Clip 50 has a resilient locking arm 10 that extends from base portion 4 in the same direction as insertion leg 8 to a free-end referenced by numeral 11. As hereinafter described with respect to FIGS. 2A-2C, arm 10 has a first surface operative to contract it inwardly when leg 8 is inserted into an aperture and a second surface operative to releasably lock clip 50 to the panel when pressed to a locking position in the aperture.

Figure 2A:
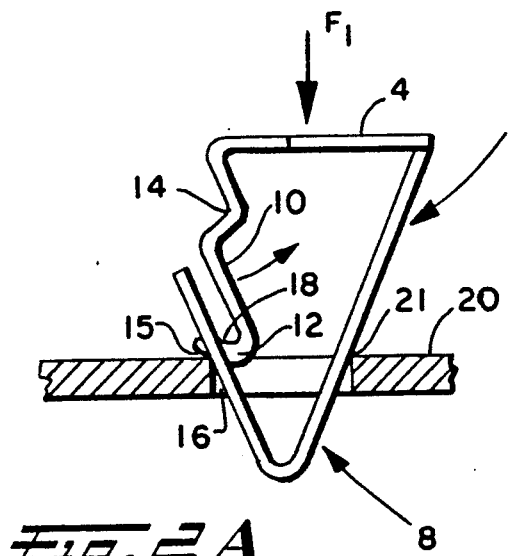
FIGS. 2A-2C are respective side views of clip 50 taken along view line 2—2 of FIG. 1.
Figure 2B:
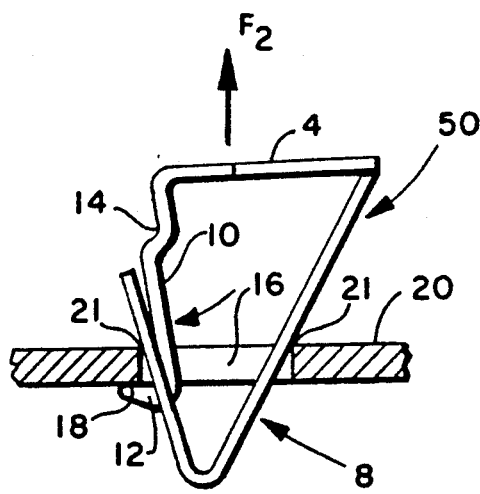

Preferably the first and second surfaces described above are located on a tab 12 and more preferably on spaced-apart tabs 12 and 12' that extend transversely from arm 10 preferably adjacent free-end 11 shown in FIG. 1 and hereinafter described for FIGS. 2A-2C.

Although insertion leg 8 may have a window 13 through which free-end 11 of arm 10 extends, it is not an absolute requirement for fastener clips having more than one resilient arm such as arm 10 on opposite sides of insertion leg 8 are considered to be within the scope of the present invention and would thus preclude the necessity of having a window in leg 8 unless such was desired to lighten the weight or for other reasons such as the additional windows in clip 50 shown in FIG. 1 that are not referenced by numerals. Arm 10 further preferably includes means such as a crease or fold or shoulder 14 adapted to provide a location for engagement by a tool for contracting it so as to release clip 50 from the aperture to which clip 50 is lockingly secured In FIG. 2A, insertion leg 8 is inserted into an aperture 16 through a panel 20. Leg 8 engages periphery 21 about aperture 16 as it is inserted into aperture 16 as shown in FIG. 2A. As leg 8 is pressed into aperture 16 by applying a downward force "F$_1$" against base portion 4 as shown in FIG. 2A, periphery 21 engages surface 15 of tab 12 and urges arm 10 inwardly as shown by the arrow in FIG. 2A. The inward contraction of arm 10 enables it to move in unison or conjunction with leg 8 through aperture 16 until surface 18 of tab 12 clears the bottom exit of aperture 16 at which point arm 10 automatically moves outwardly as shown by the arrow to enable surface 18 of tab 12 to engage the opposite side of panel 20 to releasably lockingly secure clip 50 to panel 20 by being releasably held thereagainst by the upward force "F$_2$" created by the interaction between leg 8 and periphery 21. As such, base portion 4 is in overhanging relationship to the side of panel 20 having the aperture into which leg 8 is inserted with fold or crease 14 being accessibly exposed as shown in FIG. 2B.

Figure 2C:
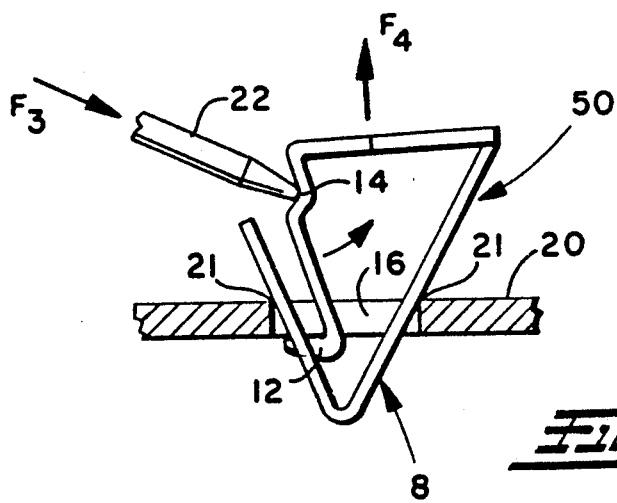

FIG. 2C illustrates one manner by which one can release clip 50 from panel 20 where the end of a tool such as a screwdriver 22 engages shoulder 14 and presses arm 10 inwardly upon application of force "F₃" thereagainst which causes arm 10 to move or contract in the direction shown by the arrow sufficiently to release surface 18 from the underside of panel 12 which in turn enables reaction force "F₄" created by impingement of insertion leg 8 upon periphery 21 to automatically urge clip 50 outwardly from aperture 16 in panel 20.

Thus the press-in fastener clip of the invention enables both rapid securement and release from an aperture in a panel in or other object by featuring resilient locking arms in combination with a V shaped insertion leg that is adapted to both enhance its securement to an aperture in a panel or other object as well as to automatically urge the clip outwardly from the aperture when the locking arm securement is manually released.

What is claimed is:

1. A press-in fastener clip having a resilient V shaped insertion leg extending from a base portion and adapted to be inserted into a panel aperture and to engage the periphery extending thereabout and urge the clip outwardly therefrom when not lockingly secured thereto, and locking means for releasably locking the clip to the panel with the base portion in overhanging relationship thereto, said locking means comprising at least one contractible resilient locking arm extending from the base portion in the direction of the insertion leg to a free-end thereof, said arm having a portion thereof accessibly exposed on the same side of the aperture into which the insertion leg is inserted and having a first surface operative to engage the panel periphery about the aperture and contract the arm so as to enable the arm to be inserted through the aperture in unison with the insertion leg and having a second surface operative to engage the opposite side of the panel and releasably lock the clip thereto by being held thereagainst by a reaction force created by interaction between the insertion leg and the aperture periphery upon expansion of the arm upon insertion of the second surface through the aperture.

2. The clip of claim 1 wherein the arm includes at least one tab adjacent the free-end that extends substantially transversely therefrom and has both the first and second surfaces thereupon.

3. The clip of claim 2 having two of the tabs in spaced-apart relationship to each other.

4. The clip of claim 1 wherein the base portion includes at least one opening adapted to receive a fastener therethrough for securing a member to the clip.

5. The clip of claim 4 having two of the openings in spaced-apart relationship to each other.

6. The clip of claim 1 wherein the resilient arm includes engagement means located at the accessibly exposed portion thereof and adapted to enable the arm to be engaged by a tool and contracted sufficiently to detach the second surface from the opposite side of the panel so as to enable the insertion leg to urge the clip outwardly from the aperture.

7. The clip of claim 6 wherein the engagement means comprises a shoulder adapted to provide an engagement location for the tool.

8. The clip of claim 1 wherein the insertion leg includes a window and the locking arm free-end extends therethrough.

* * * * *